(12) United States Patent
Hare et al.

(10) Patent No.: US 7,937,610 B2
(45) Date of Patent: May 3, 2011

(54) FAST NODE FAILURE DETECTION VIA DISK BASED LAST GASP MECHANISM

(75) Inventors: John R. Hare, Highland, NY (US);
Felipe Knop, Lagrangeville, NY (US);
Thomas V. Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 11/741,384

(22) Filed: Apr. 27, 2007

(65) Prior Publication Data
US 2008/0270823 A1 Oct. 30, 2008

(51) Int. Cl.
*G06F 11/00* (2006.01)

(52) U.S. Cl. ............................................. 714/4; 714/48

(58) Field of Classification Search .................. 714/3, 4, 714/5, 47, 48
See application file for complete search history.

(56) References Cited

U.S. PATENT DOCUMENTS

| | | | |
|---|---|---|---|
| 5,528,750 A * | 6/1996 | Lubart et al. ............... | 714/15 |
| 5,848,073 A * | 12/1998 | Abdelmonem et al. ...... | 714/704 |
| 6,353,902 B1 * | 3/2002 | Kulatunge et al. ........... | 714/712 |
| 6,442,713 B1 * | 8/2002 | Block et al. .................. | 714/43 |
| 6,609,212 B1 * | 8/2003 | Smith .............................. | 714/4 |
| 6,629,266 B1 * | 9/2003 | Harper et al. ................. | 714/38 |
| 6,643,802 B1 * | 11/2003 | Frost et al. ..................... | 714/37 |
| 6,675,315 B1 * | 1/2004 | Semler et al. .................... | 714/4 |
| 6,802,020 B1 * | 10/2004 | Smith ................................ | 714/4 |
| 6,978,398 B2 * | 12/2005 | Harper et al. ................. | 714/13 |
| 7,003,645 B2 * | 2/2006 | Knop et al. ................... | 711/170 |
| 7,730,364 B2 * | 6/2010 | Chang et al. .................. | 714/47 |
| 2002/0169861 A1 * | 11/2002 | Chang et al. ................. | 709/223 |
| 2003/0158921 A1 * | 8/2003 | Hare et al. .................... | 709/221 |
| 2004/0123050 A1 * | 6/2004 | Knop et al. ................... | 711/147 |
| 2004/0205148 A1 * | 10/2004 | Bae et al. ...................... | 709/213 |
| 2004/0225911 A1 * | 11/2004 | Smith ............................... | 714/4 |
| 2005/0066221 A1 * | 3/2005 | Benhamou et al. .............. | 714/5 |
| 2005/0128960 A1 * | 6/2005 | Chang et al. .................. | 370/254 |

* cited by examiner

*Primary Examiner* — Bryce P Bonzo
*Assistant Examiner* — Elmira Mehrmanesh
(74) *Attorney, Agent, or Firm* — Matthew W. Baca, Esq.; Blanche E. Schiller, Esq.; Heslin Rothenburg Farley & Mesiti P.C.

(57) ABSTRACT

A method for communicating node liveness in a multinode data processing system employs an operating system function that provides a degree of self-awareness in "sensing" an imminent but still pending failure as the basis for providing special flag signals over a channel which employs nonvolatile storage in a heartbeat signaling path.

16 Claims, 10 Drawing Sheets

FAST NODE FAILURE DETECTION VIA DISK BASED LAST GASP MECHANISM

TECHNICAL FIELD

In general, the present invention relates to methods and systems for the detection and communication of node liveness in a multinode data processing system. More particularly, the present invention is directed to a mechanism which is more effective in communicating an indication of node failure which avoids the resource costly results of a false positive determination. Even more particularly, the present invention employs the concept that a node is self-aware of its own imminent failure to initiate communication of the failure through the exploitation of operating system features which are more likely to successfully communicate this fact to one or more other nodes.

BACKGROUND OF THE INVENTION

Adapter and node liveness determination lie at the heart of any highly available distributed cluster system. In order to provide high availability services, a cluster system should be able to determine which nodes, networks, and network adapters in the system are working. Failure in any such component should be detected, informed to higher level software subsystems and if possible recovered from by the cluster software and applications.

Determination of node, network, and network adapter liveness is often made through the use of daemon processes running in each node of the distributed system. Daemons run distributed protocols and exchange liveness messages that are forced through the different network paths in the system. If no such liveness messages are received within a predetermined interval then the sending node or network adapter is assumed by the others as having failed ("died").

In a high-availability cluster, precise determination of adapter, network, and node events is crucial, since a cluster recovery manager subsystem will react to such events in an attempt to give the appearance to the end-user that cluster resources are still available. For example, if a node in the cluster fails, the cluster manager transfers any resources being hosted or controlled by the failed node to another node which is still functioning. In such cases, if a given node is detected as down, then the correct behavior of the cluster depends on that node actually being down. Otherwise there will be two nodes in the cluster both trying to control the same resource. Such resource concurrency may have devastating effects for the cluster, especially if the resource is a disk, in which case the result may be a corrupted file system.

Because the detection of failed nodes or network adapters is based on missing periodically sent liveness messages, the time it takes to detect a failure is related to how many liveness messages are allowed to be missed before a node is declared as being down. Detecting a failure quickly requires lowering the threshold for missed messages, but this approach has a downside. If the network has a short-lived outage, or the sending node's daemon is unable to be scheduled during a period, a node may fail to send its liveness messages, possibly resulting in the remote node erroneously declaring the initial node as down (a "false node down" situation). Such occurrences have a negative impact on the cluster, since it forces the cluster manager to recover from the perceived failure by moving resources to another node. In this regard, it should be fully appreciated that the shifting of resources can be both time consuming and consumptive of resources in its own right.

To alleviate the problem, the threshold for missed messages is usually made high enough so that "short term outages" do not result in false "node down" indications but rather having the penalty of a longer period between a failure and when it is detected by the remote node. During such a period, the cluster is not providing services to its external users.

SUMMARY OF THE INVENTION

A mechanism is proposed that drastically reduces the node failure detection time by sidestepping the tradeoff above. The mechanism is activated when the failure is caused by the abnormal termination of the operating system (OS). An OS kernel callback is invoked at the time the OS is about to terminate ("crash") and that callback is used to notify the remote node via a shared disk. The callback functionality is present in the AIX™ operating system offered as a product by the assignee of the present invention. It is noted, however, that the use and structure of the present invention is not limited to any particular data processing operating system.

A method is provided herein for the quick determination of node death in a system with clustered nodes. If the operating system stops abnormally then, before failing, it writes a message into a known sector of a disk shared with another node, thus allowing such remote node and the remaining nodes in the cluster to be notified about the first node's demise. This writing may be accomplished through the exploitation of operating system failure modalities in which the contents of volatile memory are written to a non-volatile storage medium (say, disk) for later analysis. Such processes generally go by the name "SYSDUMP."

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Preliminarily, it is noted that "adapter," as that term is used herein, refers to a communication device that connects hardware data processing nodes to various forms of communication networks or to a switch. In the IBM System p product mentioned above, the switch or network is responsible for the transmission of messages from one node to a designated node, and more specifically to one of the adapters connected to the designated node. The determination of node liveness and proper adapter functioning, particularly as it relates to the appearance of node failure arising out of communication problems, lie at the heart of highly available distributed cluster data processing systems. In order to provide high availability services, a cluster system should be able to determine which nodes, networks, and network adapters in the system are working. Failures in any of these components should be detected, the information about the failure passed on to higher level software subsystems, and if possible recovered by the cluster software and application programs.

Determination of node, network, and network adapter liveness is often made through the use of daemon processes running in each node of the distributed system. Daemons run distributed protocols and they exchange liveness messages that are forced through different network paths in the data processing system. If no such liveness messages are received within a predetermined time interval, then either the sending node or a network adapter is assumed not to be working, that is, it is considered by the other nodes to be "dead."

In a high-availability data processing cluster, precise determination of adapter, network, and node events is very important, since the cluster manager subsystem reacts to such events in an attempt to give the appearance to the end-user that cluster resources are still available. For example, if a node in the cluster fails, the cluster manager transfers any resources being hosted or controlled by the failed node to another node which is working. (In the IBM System p data processing systems mentioned above, the function of cluster manager is provided by a program product called HACMP). In such a case, if a node is detected as down ("dead"), the correct behavior of the cluster depends on the detected-down-node actually being down. Otherwise, if the node is not in fact down, there is a very good possibility that there would be two nodes in the cluster both trying to control the same resource.

Figure 1:
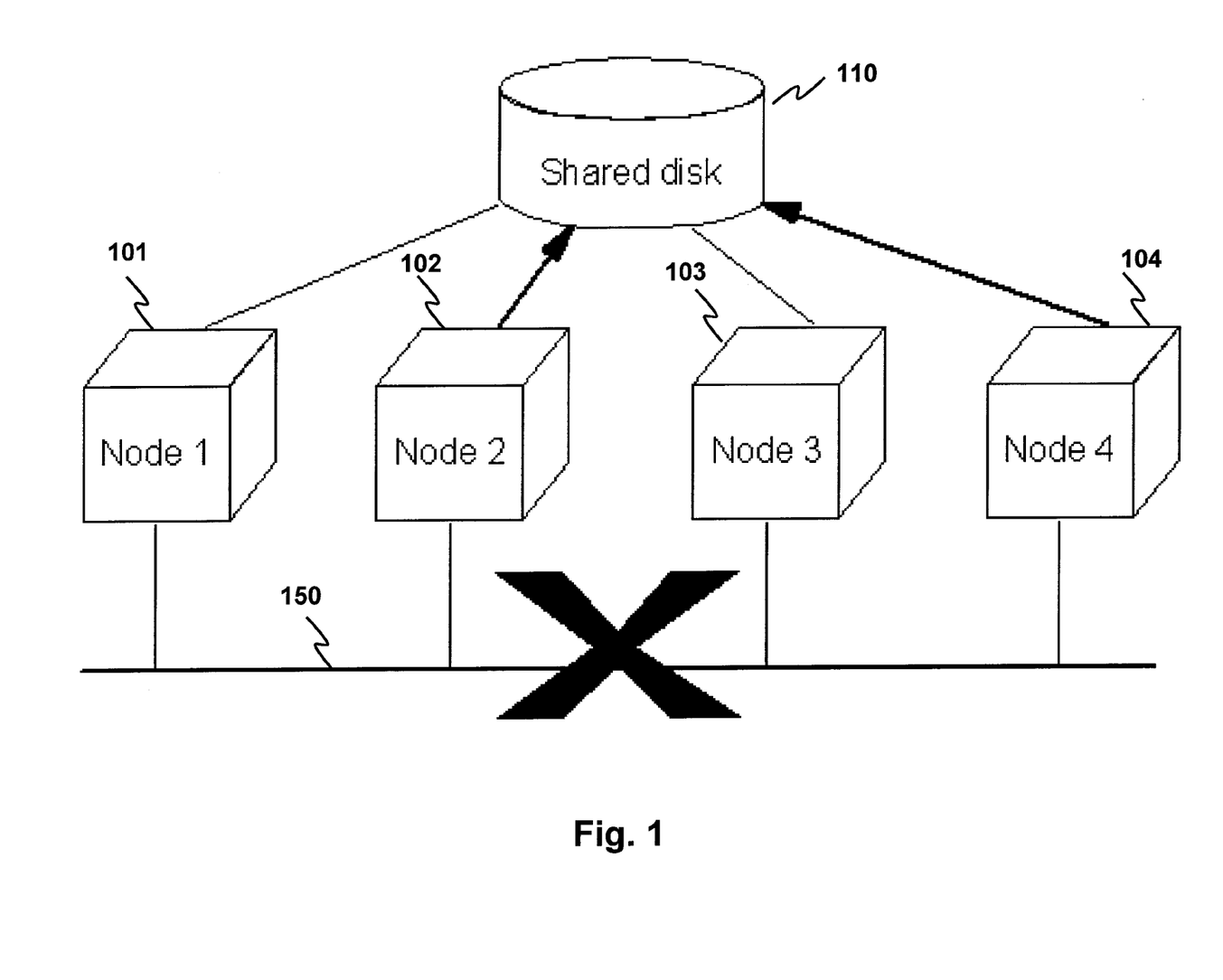
FIG. 1 is a block diagram illustrating the environment in which the present invention is employed and more particularly illustrating the role of a shared disk as providing a secondary communication link.

FIG. 1 illustrates the multinode, shared storage environment in which the present invention is employed. Only four nodes are shown for convenience. In particular Node 1, Node 2, Node 3 and Node 4 (reference numerals 101 to 104, respectively) have access to nonvolatile storage device 110, which for purposes of more easily understanding the operation and advantages of the present invention, is best thought of as comprising a rotating magnetic disk storage device. Nodes 101 to 104 also communicate over network 150, typically via the use of Internet Protocol (IP) transmissions. It is noted though that the present invention is capable of operating as more than just a backup path and that it is also equally capable of transferring data of the same kind that is carried by network 150. FIG. 1 particularly illustrates the situation in which, when the network is intact, Nodes 101 to 104 can communicate and shared disk 110 is owned by Node 104. When the network connection fails, as indicated by the break shown by the large "X," Nodes 101 and 102 consider Nodes 103 and 104 as having failed. This could otherwise cause Node 102 to take ownership of the disk, leading to possible disk corruption, since Node 104 is still writing to the disk. More particularly the present advantage employs an operating system function in which failure is indicated as being imminent.

Figure 2:
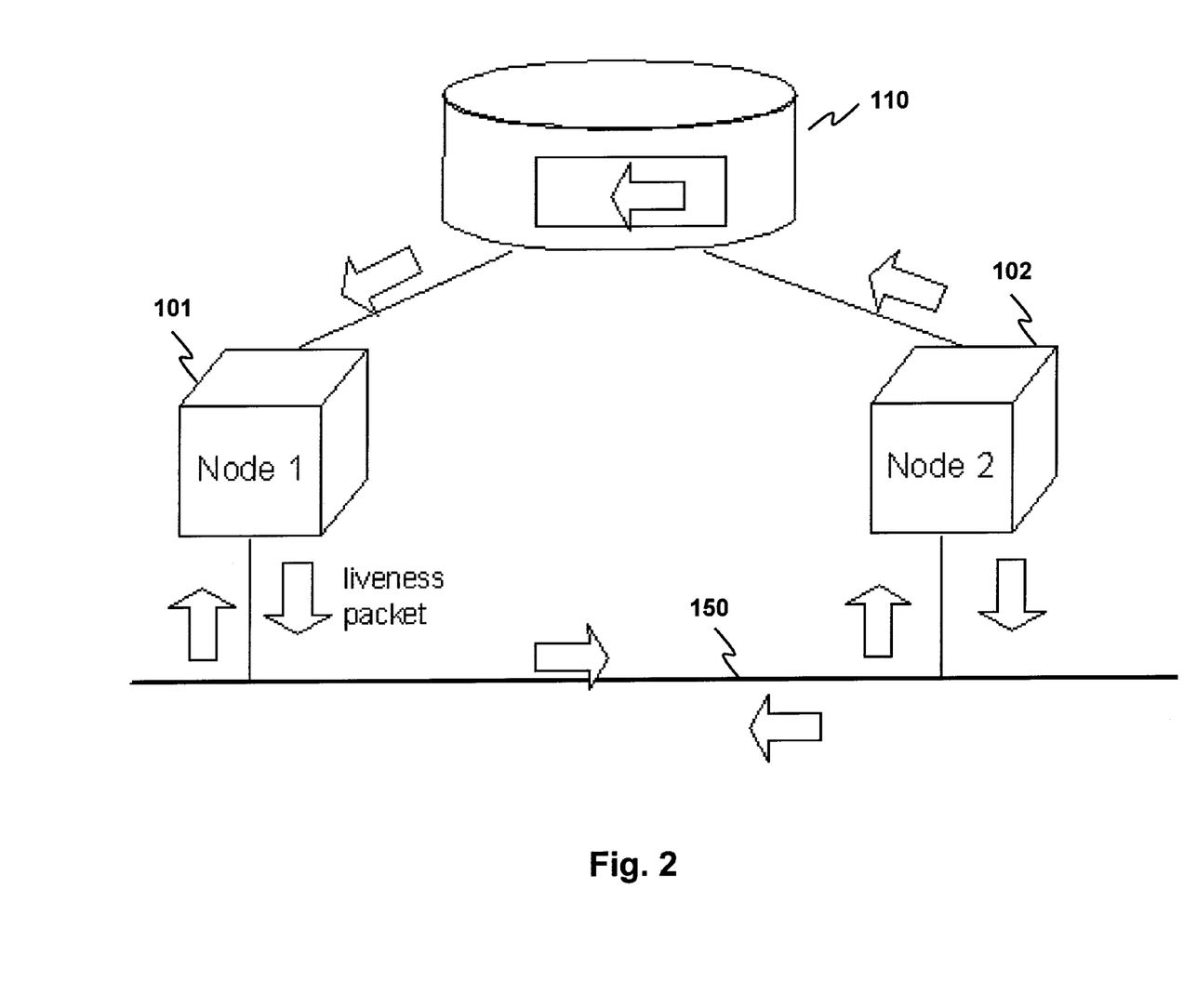
FIG. 2 is similar to FIG. 1 except that it is simplified to a two node situation for ease of better understanding the flow of liveness messages in the system.

One mode of operation of the invention shown in U.S. Pat. No. 7,003,645 is illustrated in FIG. 2, where, for simplicity, the operation of only two nodes is considered. In particular, FIG. 2 illustrates that the use of the present invention permits two forms of data transfer to occur at the same time. Network connection 150 is shown being used specifically for the transfer of "liveness" information packets from Node 101 to Node 102 and vice versa. Additionally, the system shown provides, via reading and writing protocols and control information, an additional path for communication through shared disk 110.

Figure 3:
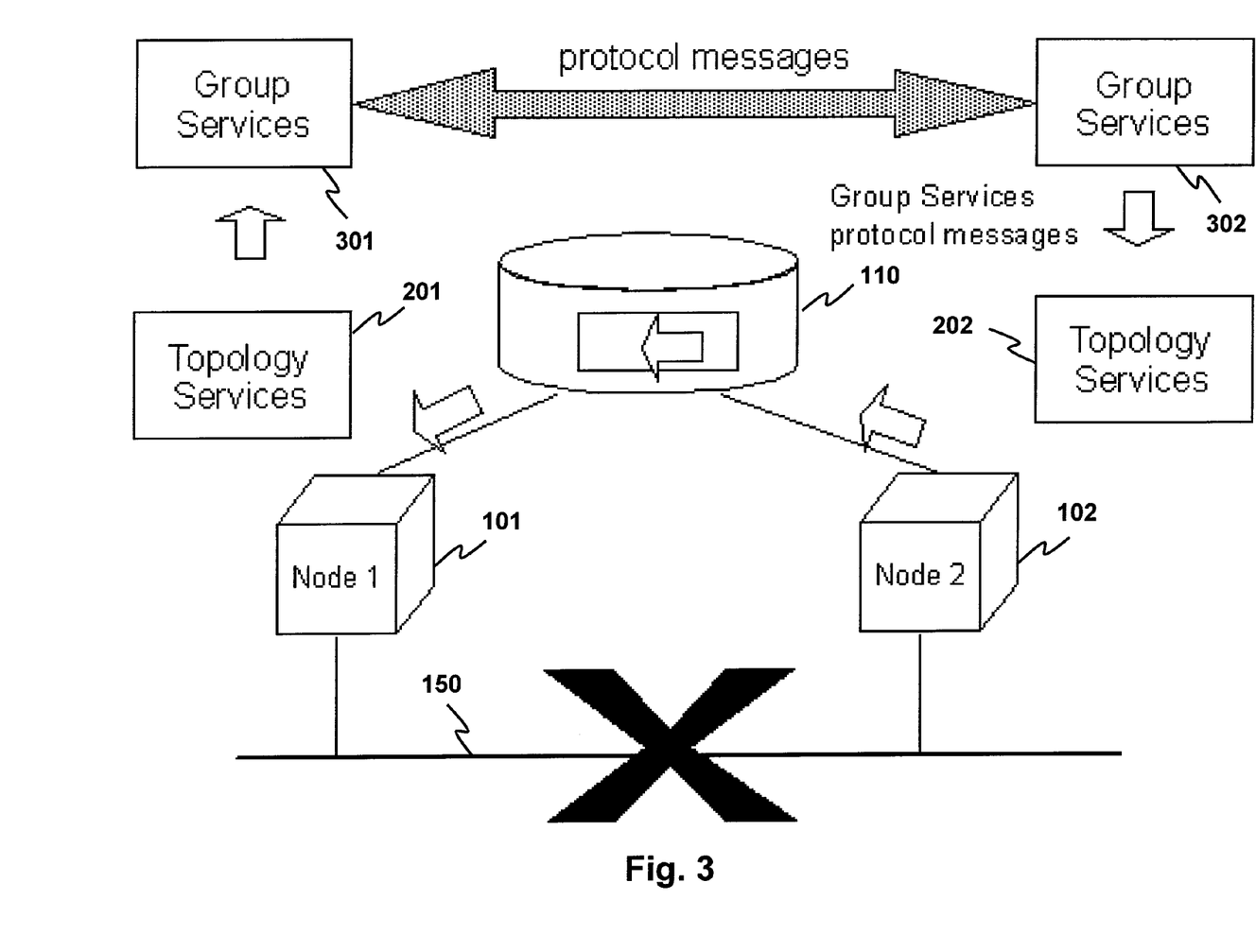
FIG. 3 is a view similar to FIG. 2 except that it shows flow paths through topology and group services components.

FIG. 3 illustrates existing services and their relationships. In particular, Node 101 uses, at the lowest level, Topology Services 201 (202 for Node 102) which communicates with Group Services 301 (302 for Node 102). Group Services is the IBM supplied utility layer that actually runs protocols that require data transfer between Node 101 and Node 102 through shared device 110. Group Services performs the actual transfer of protocol messages, as seen in FIG. 3. Group Services protocols proceed even in the absence of IP communication between Nodes 101 and 102 via network path 150. In this case, Group Services (say, 302) delivers its protocol messages to the local Topology Services (say, 202) daemon, which transmits the message via the disk to peer Node 102. At the destination node, the Topology Services daemon sends the message to the local Group Services daemon.

Figure 4:
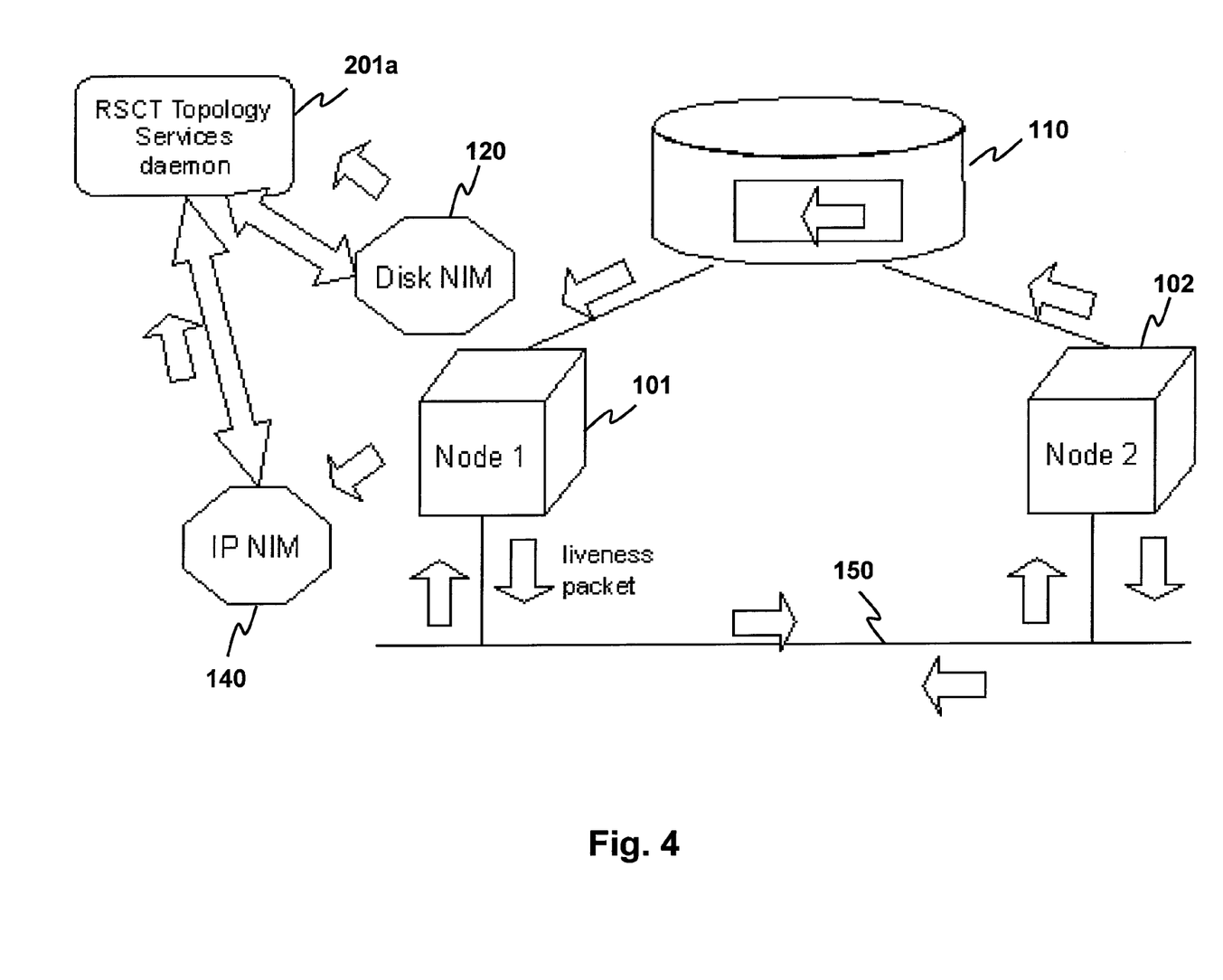
FIG. 4 is similar to FIG. 3 except that greater detail is provided with respect to the role of the service daemons.

As seen in FIG. 4, Topology Services daemon 201a (which is part of Reliable Scalable Cluster Technology (RSCT)) employs auxiliary processes "NIMs" (Network Interface Modules) to handle low-level communications with each specific network adapter. Protocol packets produced by the Topology Services daemon 201a are sent to each NIM, which then transmits the packet to the physical media. The same happens in reverse on the receive side: the packets are received by the NIMs and are then forwarded to Topology Services daemon 201a. While IP NIM 140 uses standard socket UNIX primitives to send and to receive data packets, disk NIM 120 uses its own protocol, which is based on storing packets on the disk until they can be retrieved by the destination node.

Figure 5:
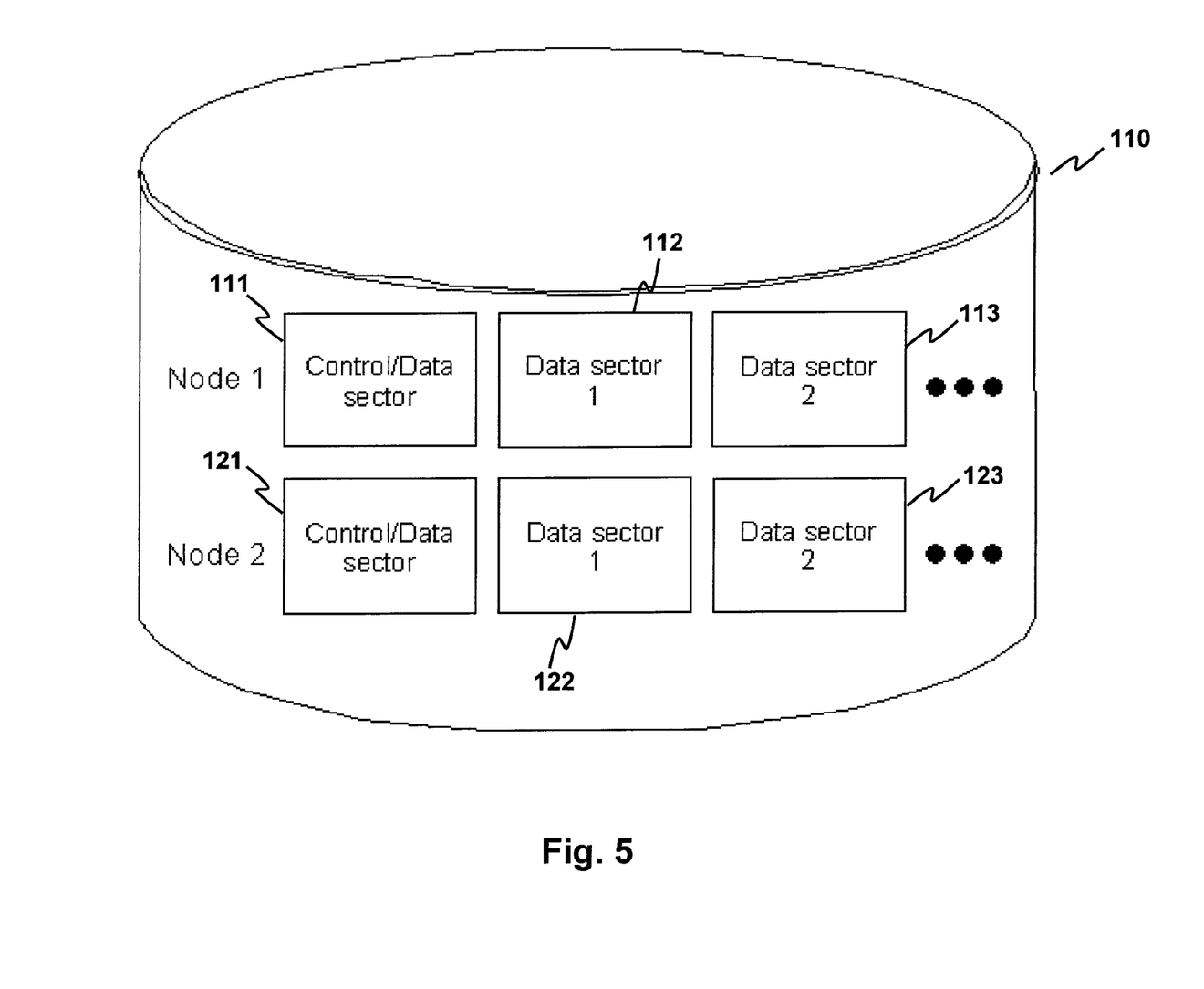
FIG. 5 is a block diagram illustrating the structure and location of the disk areas allocated to two nodes as used to communicate liveness data and, more particularly, to communicate "last gasp" information.

FIG. 5 illustrates, from a higher level, a data structure that may be provided on shared disk 110 for carrying out the objectives of the present invention. In particular, data structure layouts are illustrated for two nodes: Node 1 and Node 2. Each node is allotted a sector which is used for both control and for data: Control/Data Sector 111 for Node 1 and Control/Data Sector 121 for Node 2. A group of sectors is "owned" by Node 1 and group of sectors is "owned" by Node 2. Only the owner of a sector may write to it. The other sectors owned by a node (Data Sectors 112 and 113 for Node 1 and Data Sectors 122 and 123 for Node 2, as shown) are used to transmit data only and are linked to Control/Data sectors via pointers or links such as those more particularly shown in FIG. 6. When only small amounts of data are to be transmitted, storage space available in Control/Data Sectors 111 and 121 are employed, thus obviating the need for separate disk access operations to different sectors. Thus, the shared disk area is used not only to store packets "in flight" but may also be used to store concurrency and flow control information.

Figure 6:
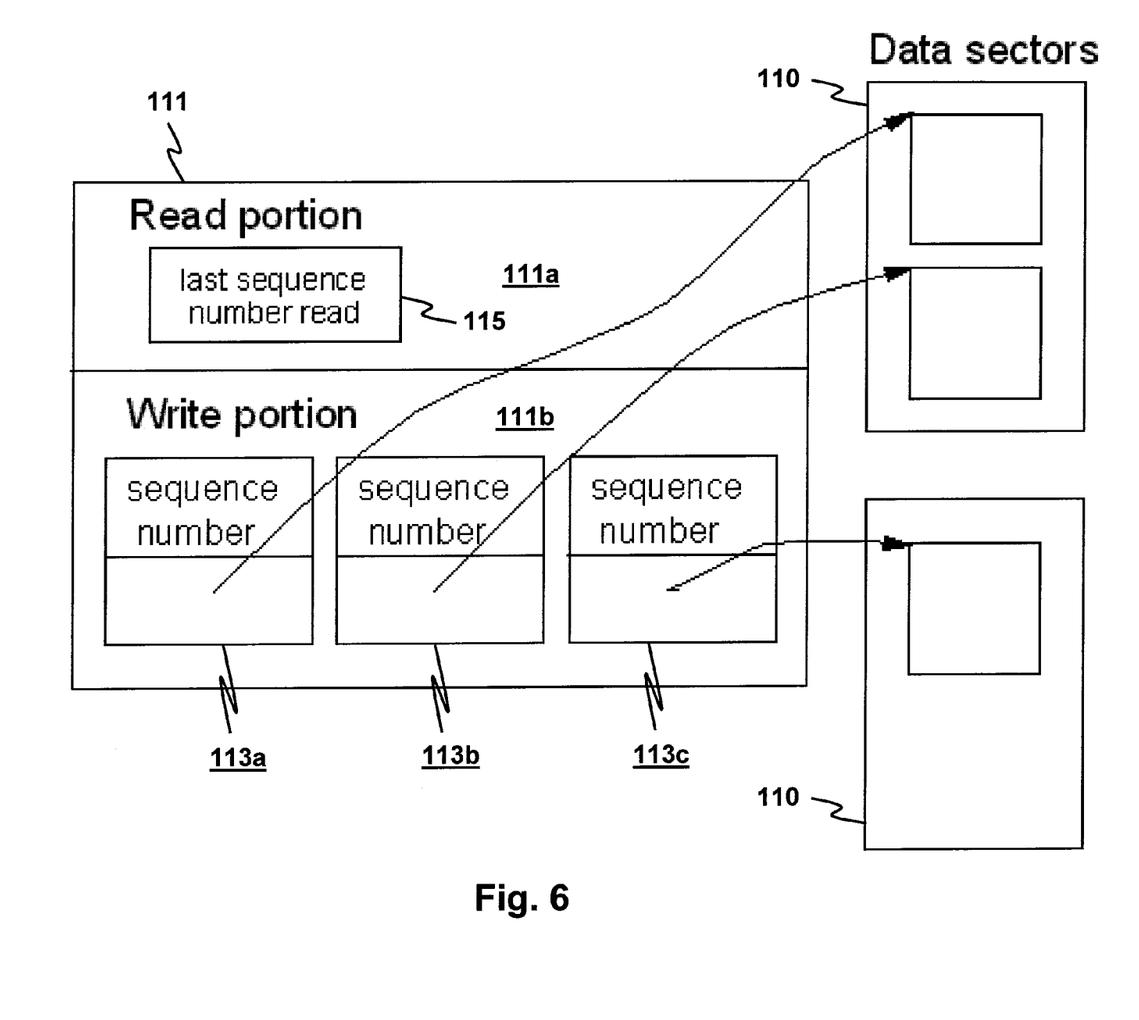
FIG. 6 is a block diagram illustrating in greater detail the structure and function of the Control Sector shown in FIG. 5.

FIG. 6 provides a more detailed view of Control/Data Sector 111 for Node 1. The structure for other nodes is similar. Control/Data Sector 111 is divided into Read Portion 111a and Write Portion 111b. Read Portion 111a contains an indication of the "last sequence number read" 115 associated with data packets written by another node, say Node 2. Write Portion 111b refers to a portion of sector 111 used by the owning node, Node 1 in this case, for storing data before it is read by another node. This area contains data to be transferred and/or, as shown in FIG. 6, pointers to various sectors of data on shared disk 110 to be transferred. Write Portion 111b is used by the non-owning node to locate the packets to be read.

A method for the quick determination of node death in a system with clustered nodes is provided herein. If the operating system stops abnormally, then before failing it writes a message into a known sector of a disk shared with another node, thus allowing such remote node and the remaining nodes in the cluster to be notified about the first node's demise. The structure and content of this message possess great latitude and may be fashioned to suit many particular purposes in different failure situations. For example, the reason for failure might be included along with a possible indication of expected "down time." The message might also include the time of failure along with the name of the node and/or cluster, although these latter items are usually implicit in the structure.

Figure 7:
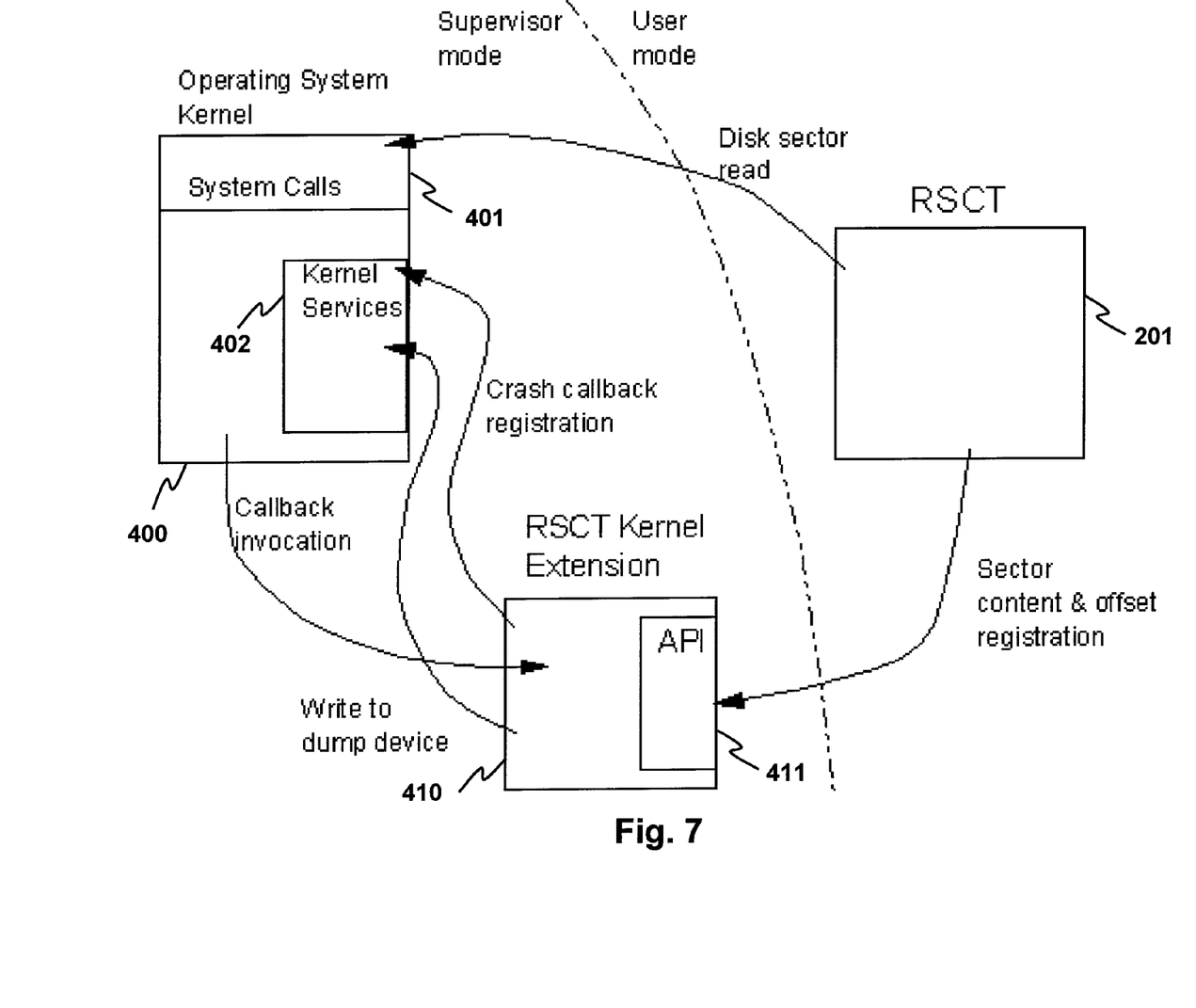
FIG. 7 is a block diagram illustrating the structure and data flow paths for a kernel extension employed in the present invention.

FIG. 7 illustrates information flow across RSCT 210 (the Topology Services component), the OS kernel, and the kernel extension included with RSCT. RSCT 210 invokes kernel extension 410 through API 411 to register each disk sector to be written. The kernel extension registers with the kernel in order to have a procedure in the kernel extension invoked when the OS is about to crash. Once a crash occurs, the kernel extension uses system dump functions in the kernel to write the "last gasp" messages to disk. The content and disk location for these messages are included in the registration received by Topology Services. This structure provides improved code maintainability.

Figure 8:
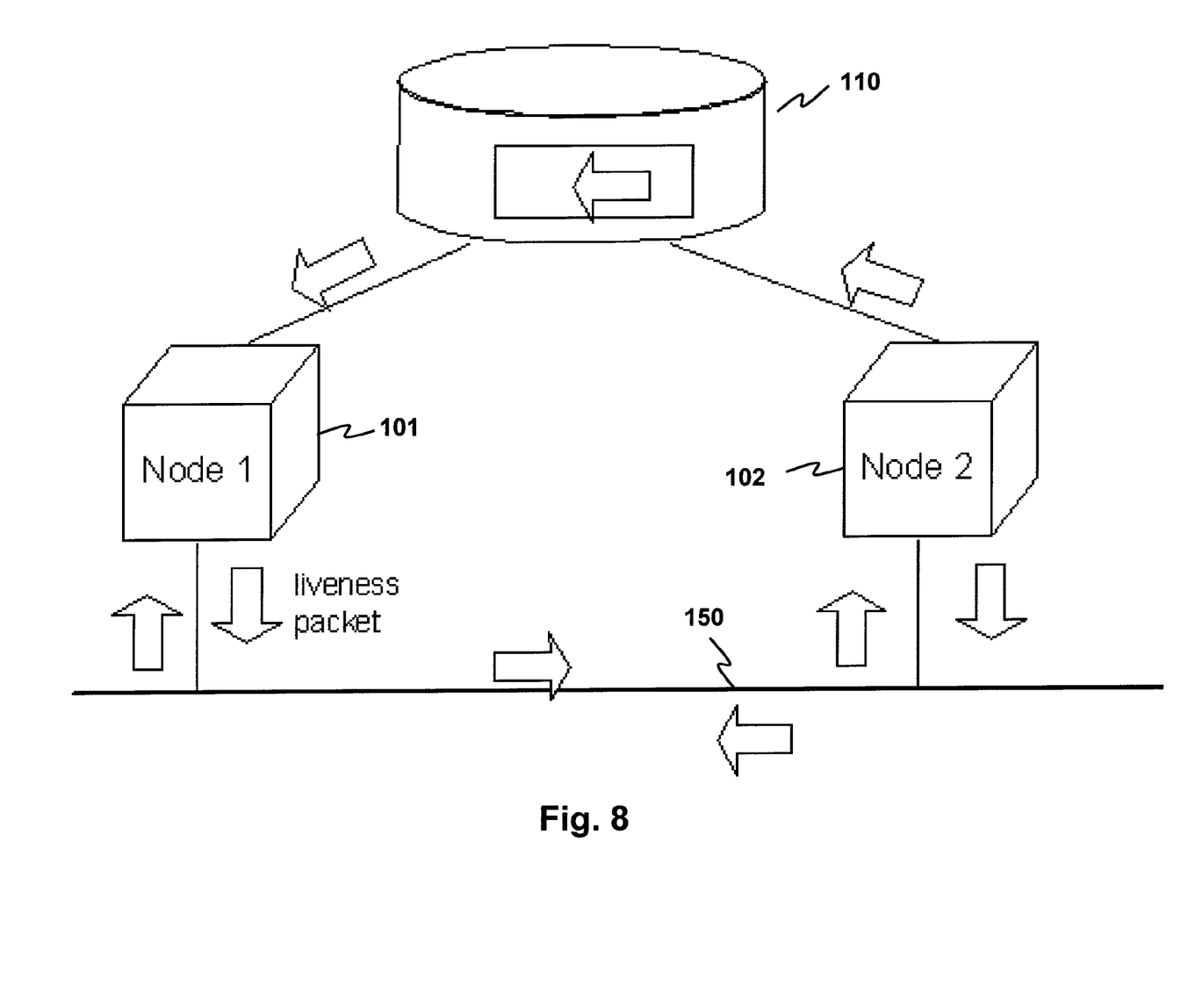
FIG. 8 illustrates the dual flow path for liveness packets employed in the present invention.
Figure 9:
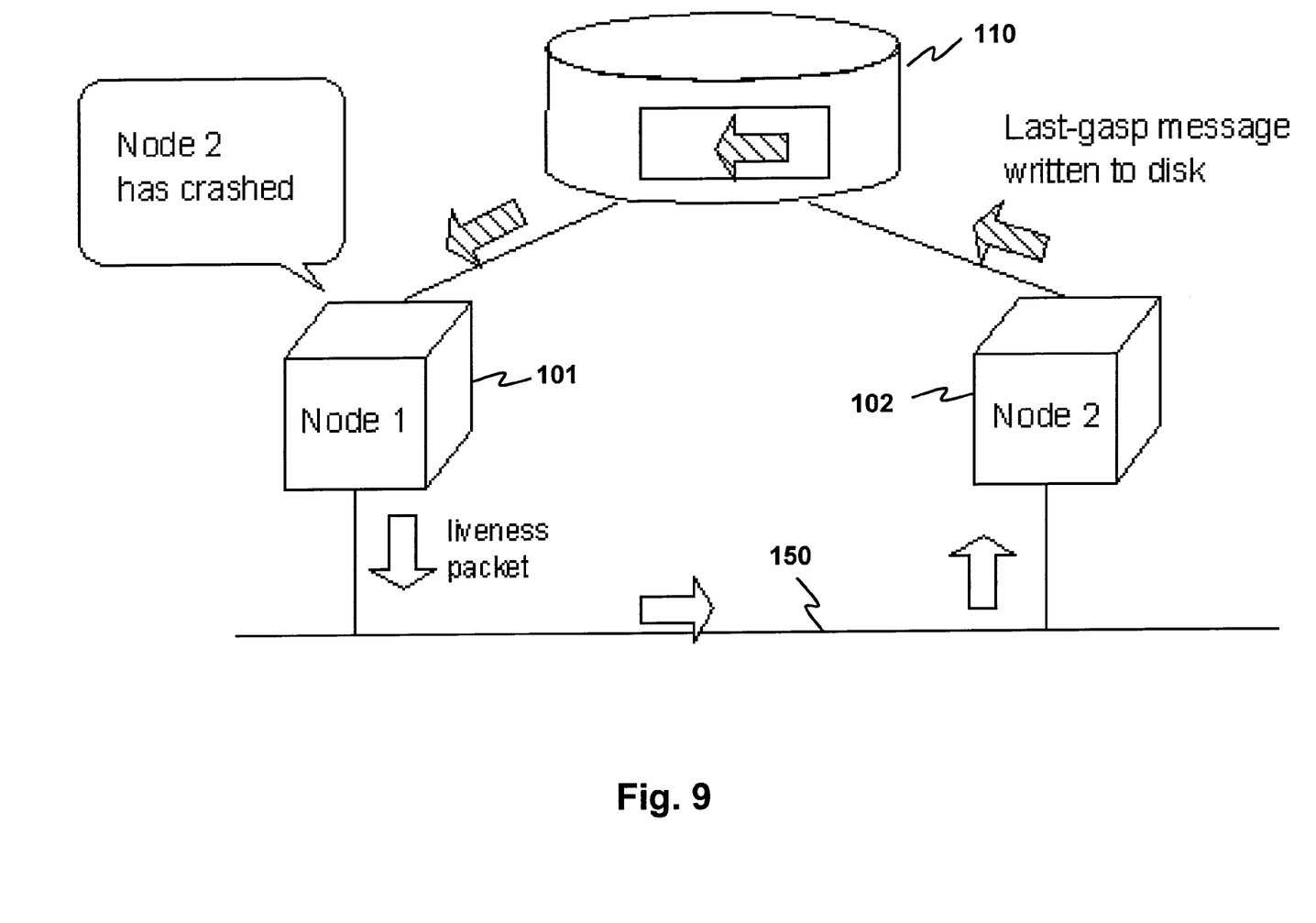
FIG. 9 illustrates the information flow path and data transfer that occurs in a "last gasp" scenario as addressed by the present invention.

FIG. 8 illustrates a normal steady state condition for the systems of the present invention. In this state liveness packets flow through the normal communications network, but also through the disk, which is also used as path for the liveness packets. In contrast, FIG. 9 illustrates the situation in which Node 2 crashes and writes a last-gasp message to the shared disk.

Figure 10:
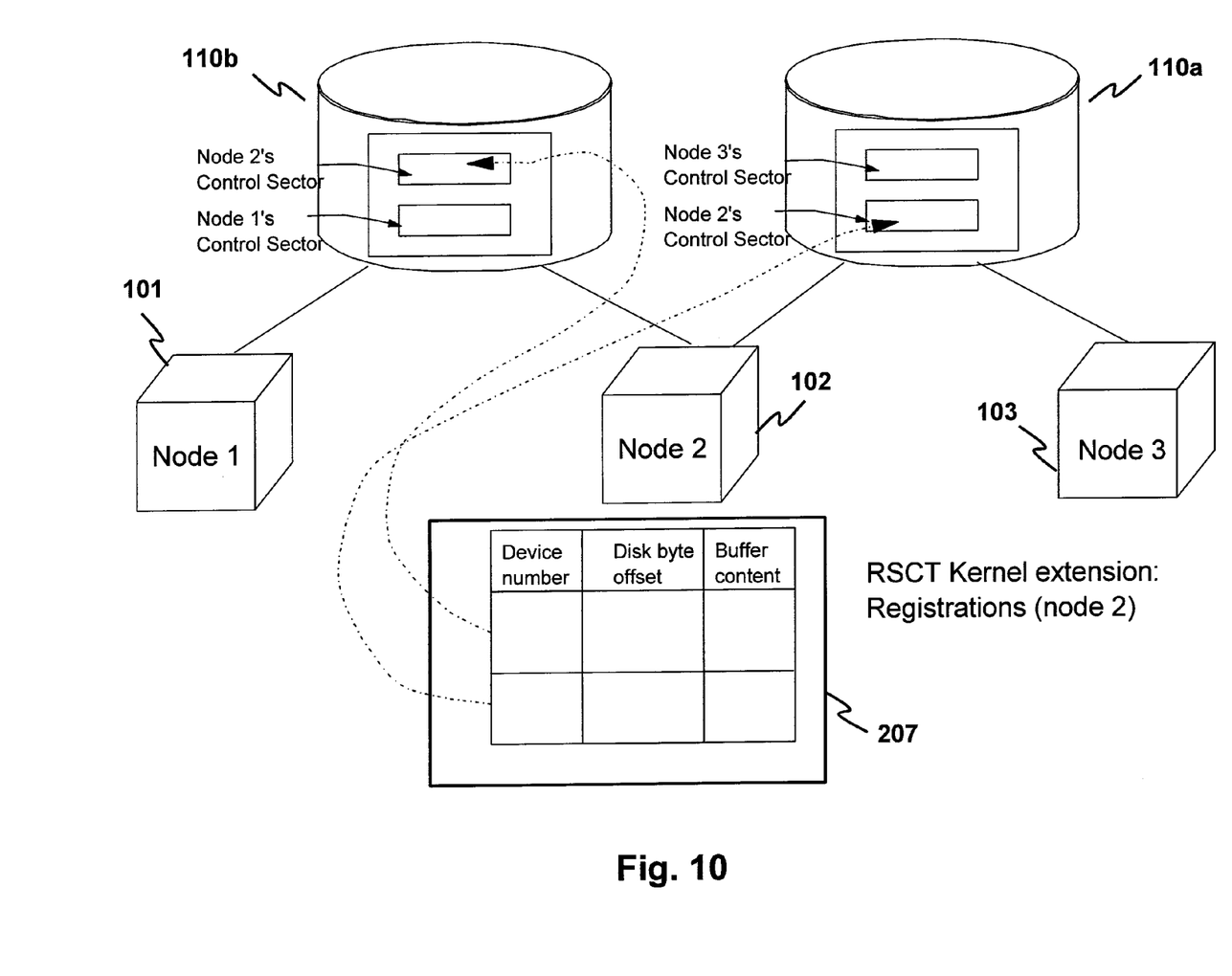
FIG. 10 is a block diagram similar to FIGS. 2, 5 and 6 but more particularly illustrating the RSCT kernel extension storing copies of "last gasp" messages, which are to be copied to appropriate locations in the disks being shared by the nodes shown.

FIG. 10 illustrates that RSCT kernel extension 410 stores copies of "last gasp" messages, which are to be copied to appropriate locations in the disks being shared by node 2 with nodes 1 and 3. Kernel extension 410 stores, for each such message, the device number, disk offset, and a copy of the message contents. See FIG. 10. Once the kernel callback is invoked, kernel extension 410 writes each message to its corresponding location on the given disk.

1.0 INTRODUCTION

1.1 Background

A mechanism is proposed that drastically reduces the node failure detection time by sidestepping the tradeoff above. The mechanism is activated when the failure is caused by the abnormal termination of the operating system (OS). An OS kernel callback is invoked at the time the OS is about to terminate ("crash") and that callback is used to notify the remote node via a shared disk.

1.2 Disk Heartbeating

To prevent short-term outages in a network from causing a false "node down" indication, multiple networks are employed. In this situation, a node is not determined as being "down" until it appears as "down" in all of the networks being monitored. On the other hand, while multiple networks seem to address outages in any individual networks and adapters, a concern remains that the IP (Internet Protocol) subsystem becomes a single point-of-failure, that is, if IP communication fails, then one or more nodes may be "isolated" and may be incorrectly detected as "down." Because of such a possibility, clusters often resort to "non-IP heartbeating," which comprises using communication media that do not rely on IP for the purpose of transmitting liveness information. The use of "non-IP" networks then avoids the single point-of-failure created by depending on IP to convey liveness information among cluster nodes.

One type of "non-IP" network is an RS-232 serial line connecting a pair of nodes. Serial connections are relatively inexpensive and the basic support for them is usually available within the operating system kernel for data transmission. There are, however, two drawbacks to this approach:
 (1) it requires connections in all of the nodes in the cluster, with the bare minimum being a "daisy-chain" topology, where a node is connected to two others in the cluster; and
 (2) in some systems, adapter card slots are at a premium, and requiring two extra card slots just for cluster liveness may be considered to be undesirable.

Another possible "non-IP" network makes use of the shared disk path: the SCSI bus. This approach solves the two drawbacks of the RS-232 networks by not requiring any extra hardware, but it does have another drawback: it depends on specialized support in the operating system to allow nodes to communicate using the SCSI bus.

An alternative approach to node communication is described in U.S. Pat. No. 7,003,645 which is also assigned to the same entity as the present invention. The process described in this patent does not use the disk path, but the shared disk itself for transmitting liveness information. Data to be sent from one node to the other is written to the shared disk and is then retrieved by the destination node. This is a "building block" that allows a disk to "behave like a network." However, this patent did not contemplate the presence of operating system functionality related to an imminently perceived failure. This patent also did not contemplate the transmission of a "last gasp" message. The "disk heartbeating" mechanism forms the basis of the proposed fast failure detection described herein

1.3 Topology Services and Network Interface Modules

The proposed mechanism is introduced in the context of its use in the Topology Services subsystem, which is part of IBM's Reliable Scalable Cluster Technology (RSCT) infrastructure. However, those familiar with current clustering technology in the industry will immediately recognize that the technique here is applicable to any clustering technology that uses software detection of node failure.

Topology Services is the liveness layer of the cluster, being responsible for determining liveness for the nodes, networks, and network adapters in the cluster. Above Topology Services runs Group Services, which provides group communications and protocols that are used by higher-level services such as cluster managers and parallel databases.

Topology Services has a well-defined interface between its higher-level adapter membership protocols—which are used to determine the set of adapters and nodes that are "up" and "reachable"—and its lower-level specific adapter communications. The interface is designed so that all network adapter intricacies are handled by the lower-level "Network Interface Module" (NIM) program. With such layering, adding support in Topology Services for a new network type means just adding a new NIM for the adapter.

Commands that the NIM has to honor are of the following types:
  connect to local adapter (meaning is adapter-specific)
  disconnect from local adapter
  send a message—send a message to a given destination
  start sending liveness messages
  stop sending liveness messages
  start monitoring liveness messages
  stop monitoring liveness messages
  NIM liveness check
  exit Responses from the NIM back to Topology Services are of the following types:
  response to "connect" command
  local adapter up/down status
  local adapter up/down status
  remote adapter up/down status
  incoming message—sent by a remote node
  response to NIM liveness check To allow the disk to be used as a liveness communication medium, one only needs to employ a NIM that implements the commands and responses listed above. When such a NIM is employed the disk behaves just like any other network used by Topology Services. The disk can then be used both to run liveness protocols and to transmit node-to-node messages for the RSCT Group Services subsystem. In case of an outage in all the IP networks the cluster can still continue operating, with remote nodes still being considered up, and with cluster manager protocols being "routed" through the disk NIM. The latter is achieved with Topology Services computing node-to-node routes that bypass the IP networks (if these failed) and using any available disk paths.

1.4 The Disk Network Interface Module

To more easily allow the shared disk to be used as communication medium, a portion of the disk is allocated for exclusive use of the NIM. Such portion is not touched by the underlying operating system, which usually implies either: (1) a whole disk partition is allocated just for the disk NIM; or (2) disk blocks that are left unused by the operating system. Approach (1) tends to waste disk space and also requires that the administrator set up the dedicated partition, which adds to the overall manual work of getting the cluster up and running. Approach (2) eliminates the drawback above, but usually leaves a very small disk area that can be used by the NIM.

The NIM disk area is used by the NIM as temporary packet storage area before the packet is retrieved by the remote side. Because disks cannot be read/written on a byte basis but just on a sector basis, multiple nodes cannot be allowed to write on the same sector, otherwise a node might overwrite data written by the another node. Because of this, sectors are "owned" by each node, which means that the sectors are given exclusive write access to one node or another by the NIM protocol.

The shared disk area is used not only to store packets "in flight" but also concurrency and flow control information. Some sectors are "owned" by the node "transmitting" a packet, while others are "owned" by the node "receiving" a packet. The "writer area" of the disk includes the actual packet being "transmitted" and the "reader area" includes information on whether the given packet was already read. Notice that since both sides of the disk connection need to both send and receive packets, each side owns a "writer area" and a "reader area."

To distinguish packets from one another, a monotonically increasing packet sequence number is associated with each packet. When a new packet is placed by the writer node, a new sequence number is also included with the packet, so that the reader knows that another packet is available. Once the packet is "consumed," the reader places, in its own area, the sequence number of the packet just read. This signals the writer that the disk area used by the packet is available for the next one. To avoid losing packets unnecessarily when the reader is slow to receive packets, the writer will not overwrite a previously-written packet until the reader signals its reading of the packet.

The mechanism above establishes a flow control between the writer and the reader node. If the reader stops retrieving packets then this forces the writer to stop writing new packets into the disk. The writer then starts buffering new packets in memory, and eventually has to discard them. Such behavior is still acceptable for the NIM, because it is not much different than an IP NIM that runs out of operating system packet buffer space when the reader process stops consuming the packets. Higher level Topology Services protocols issue any needed message send retries.

The Writer Area includes a Control Sector containing, for each message, a sequence number position of the message on the disk and Data Sectors containing the actual messages. The Reader Area includes a Control Sector containing the last sequence number read.

2.0 Halt Callback Mechanism

The mechanism proposed herein aims to reduce the node failure detection time by having a node in the cluster, upon finding a terminal condition, notifying a remote node via the disk heartbeating interface. That is, the notification is written to the shared disk used for disk heartbeating, and the data is interpreted by the remote node as the source node announcing its impending demise.

The mechanism has components in the OS kernel, NIM (Network Interface Module), and the Topology Services daemon. The following flow is adopted:
  Topology Services is configured to heartbeat over a given shared disk.
  The NIM is instructed to establish heartbeating via the disk. The disk device is opened, and a system call—implemented via an RSCT kernel module—is invoked to register the device for a halt callback.
  The RSCT kernel module registers a callback function to be invoked when the OS kernel is about to shut down. The registration includes information about the location on the disk where data should be written.
  Later, during its normal operation, the OS kernel encounters a terminal condition:
  After notifying all the CPUs and stopping all kernel services, the kernel invokes the callback function that was registered by the RSCT kernel module.

The Callback function writes data to the shared disk used for disk heartbeating (the content of data, device, and location in the disk are specified at registration time).

Data written to the disk is recognized by the remote node's NIM as "the other node having failed."

Remote NIM notifies the corresponding Topology Services daemon.

the Topology Services daemon notifies its client program and also peer daemons running on the remaining nodes.

2.1 Kernel

The following describes kernel support in the AIX™ operating system.

The only addition needed to the base kernel is the new pi_notify_reg( ) kernel service, which allows a kernel extension to register a callback, to be invoked at the time the kernel operation is about to stop—in response to a terminal event. The kernel extension is a piece of code written by "anyone" (RSCT in this case) which runs in kernel mode and which uses "kernel services" as provided by kernel 400. RSCT kernel extension 410 uses the pi_notify_reg( ) API, which is a kernel service offered by the base kernel. The extension includes an API (Application Program Interface) 411 for communication with RSCT 201. Kernel extension 410 uses the pi_notify_reg( ) function to communicate with kernel 400. The pi_notify_reg( ) call takes as a parameter the address of a function to be registered. Also shown in FIG. 7 is operating system kernel 400 which normally interacts with RSCT and other services through system calls 401. Kernel 400 also includes a standard set of kernel services 402 which includes a system dump facility and a halt callback facility.

The implementation of the new kernel service is such that the callback is invoked after most of the kernel operations have ceased, but before a system dump is generated.

To allow the RSCT kernel module to write to the shared disk, no new kernel service is needed. Since the kernel is about to halt, the system dump interfaces created for each device driver—these are normally invoked to allow the operating system dump to be copied to non-volatile storage, generally disk storage—are also used for writing the fast notification data to the disk.

Because the system dump procedures already are normally invoked in an environment where very little of the kernel is assumed to be running (for example, no interrupts can be used), they are also usable to write the impending "node down" notification to a shared disk. The already existing devdump( ) kernel service is used to write the notification data to disk.

Description of the System Dump Interfaces

2.2 RSCT Kernel Module

The Registration/Notification Kernel Module The kernel module is what allows the base kernel callback service to be usable to send a notification via the shared disk. The kernel module registers (via the pi_notify_reg( ) service on AIX™) a callback function that is invoked when the kernel is about to crash. When invoked, the callback function writes data to the shared disks that is interpreted by the NIM running on the remote side of the disk heartbeating connection as "host on the other side of the connection is about to fail."

The design of the kernel module is aimed at minimizing its knowledge of the actual data being written to the disk—with the goal being to concentrate the disk heartbeating layout implementation within the user space portion of the NIM (code in user space tends to be simpler to maintain than code inside the operating system kernel). To this end, the kernel module offers a system call by which the NIM, which is implemented purely in user space, can present "registration information" for each of the disk heartbeating NIMs running at the system. The registration includes information such as:
  device number for disk
  byte offset on the disk where data is to be written
  512-byte (physical sector size) buffer whose content is written to disk, on the given disk device and disk byte offset The kernel module stores the registration information for each of the NIMs, and then, in the event that the callback function gets invoked, it traverses each of the registrations and writes the corresponding buffer into the specified disk sector. The actual write to the disk is performed using the device's "dump" (devdump( ) kernel service) interface, which, as mentioned previously, is normally used when producing system dumps.

The registration system call is invoked when the NIM recognizes its peer on the remote node in the shared disk and starts heartbeating to it. A "deregistration" system call is used to announce to the kernel module that a NIM is no longer heartbeating to the remote peer, which happens when the remote node fails or simply when the local or remote disk connection is detected as down. In response, the kernel extension erases the corresponding registration entry.

2.3 Format of Notification Data

The disk offset position specified by the NIM during registration is such that the buffer is written to the originating node's (Writer area) Control Sector. The buffer passed during registration has the same layout of the control sector that is normally written by the NIM during a normal packet write. The difference is that a "flags" field in the layout indicates that the sender node is about to halt.

Though some of the data written via the halt callback is not totally consistent with the normal disk heartbeating sector, the information can still be identified by the receiving NIM, since the "flags" field is the first to be examined.

2.4 Remote NIM Handling

During its normal operations, a disk heartbeating NIM polls (reads) the remote node's Write Control sector, looking for new data to be written. For example, for node A to send a packet to node B, node A writes into its Write Control sector a buffer which indicates that a packet with a new instance number is available. Node B's NIM then reads the data and detects the changed packet sequence number, thus realizing that a new incoming packet is available.

If node A then fails and its halt callback is invoked then a buffer is written, by the kernel module, to A's Write Control sector. When node B reads that control sector, it interprets the flag value inside it thus conveying the information that node A is about to fail.

Note that node B does not need to read multiple sectors to scan for both normal data and for the remote node's failure: both pieces of data are available from the same disk sector. Once node B reads a control sector with a "halted" flag, it immediately informs the local node's Topology Services daemon via a "remote node halted" notification.

2.5 Daemon Handling

Once the Topology Services daemon receives a "remote node halted" notification from a NIM, the daemon will immediately:

notify Group Services about the demise of the node on the remote side of the disk heartbeating connection; and notify the remaining nodes in the cluster about the node failure.

The notification of the remote nodes is done via messages sent on any available network. Normally these will be IP networks on which the main heartbeating (and other cluster administrative) traffic flows. In case no functional IP connection remains, then the notifications are sent via non-IP links, which may include shared disks used for disk heartbeating.

FIG. 10 provides illustrations similar to FIGS. 2, 5 and 6 but ones that particular show the structure, operation and data used in the present invention in data processing systems with more than two nodes. As shown in FIG. 10, node 2 has two disk write registrations. If node 2 crashes, then the buffers stored at the kernel extension get written to the control sectors owned by node 2 on the disks it shares with nodes 1 and 3, respectively.

It is noted that reference herein to monotonically increasing numbers also includes the possibility that the sequence could be monotonically decreasing from some initial value as well. It is also noted that alphanumeric values can also be employed as elements in the sequence. The significant property in each case is the use of an ordered sequence is incrementable or decrementable.

It is also noted that reference herein to a data processing system refers to a system with at least one central processing unit, volatile storage, and nonvolatile storage usually in the form of one or more rotating magnetic or optical disk drives that may be connected directly to the system or connected via a network connection. The data processing system also comprises a set of instructions in the form of an operating system which controls and monitors system resources. A node in such a system includes volatile or nonvolatile storage and one or more central processing units.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for liveness determination in a multinode data processing system, said method comprising:

using by a node of the multinode data processing system nonvolatile data storage device heartbeating in which liveness messages are sent from the node to a nonvolatile data storage device shared with other nodes in said multinode data processing system to indicate liveness of the node, the nonvolatile data storage device being used as a liveness communication medium;

recognizing, by an operating system executing on the node, an abnormal termination of the operating system, the abnormal termination indicating that failure of the operating system is imminent; and responsive to the abnormal termination of the operating system and prior to the operating system failing, notifying, by the operating system, a remote node of the multinode data processing system of a pending node failure, wherein the notifying comprises transmitting a message to the nonvolatile data storage device used for heartbeating, the transmitting using a system dump facility present in the operating system to write a last gasp message to the nonvolatile data storage device indicating that failure of the operating system is imminent;

wherein the notifying comprises:

registering a callback function with a kernel portion of the operating system prior to recognizing the abnormal termination of the operating system, the callback function to use the system dump facility to write the last gasp message; and invoking the callback function responsive to recognizing the abnormal termination of the operating system, and wherein the callback function uses a system dump interface created for one or more device drivers of the node to write the last gasp message.

2. The method of claim 1, in which one or more liveness messages are also sent over a separate path which does not include said nonvolatile storage.

3. The method of claim 1, wherein the last gasp message includes a flag, and wherein the method further includes, at said remote node, reading said last gasp message with said flag.

4. The method of claim 3, in which said remote node determines from said flag that node death is indicated.

5. The method of claim 4, wherein responsive to indication of node death, said remote node undertakes resource reallocation within said multinode data processing system.

6. The method of claim 1, in which said system dump facility is present in a kernel portion of said operating system.

7. The method of claim 6, wherein the callback function, responsive to being invoked:

traverses one or more registration entries of a kernel extension of the kernel portion of the operating system, wherein a registration entry includes registration information identifying a disk sector of one or more nonvolatile data storage devices used for the nonvolatile data storage device heartbeating and comprising a buffer including a last gasp message; and for each registration entry traversed, using the system dump interface to write the last gasp message stored in the buffer of the registration entry to the identified disk sector, to indicate that failure of the operating system is imminent.

8. The method of claim 1, in which one or more messages are also transmitted on a periodic basis to said nonvolatile data storage device.

9. The method of claim 8, wherein the one or more messages transmitted on a periodic basis have said flag set so as not to indicate said pending node failure.

10. The method of claim 8, wherein said one or more messages transmitted on said periodic basis have the same format as said message indicating said pending node failure.

11. The method of claim 1, wherein the pending node failure comprises an impending condition which will cause the node to fail although the node has not failed completely at the time of recognition of the pending node failure.

12. A computer program product for liveness determination in a multinode data processing system, the computer program product comprising:

a storage medium readable by a processing unit and storing instructions for execution by the processing unit for performing a method comprising:

using by a node of the multinode data processing system nonvolatile data storage device heartbeating in which liveness messages are sent from the node to a nonvolatile data storage device shared with other nodes in said multinode data processing system to indicate liveness of the node, the nonvolatile data storage device being used as a liveness communication medium;

recognizing, by an operating system executing on the node, an abnormal termination of the operating system, the abnormal termination indicating that failure of the operating system is imminent; and responsive to the abnormal termination of the operating system and prior to the operating system failing, notifying, by the operating system, a remote node of the multinode data processing system of a pending node failure, wherein the notifying comprises transmitting a message to the nonvolatile data storage device used for heartbeating, the transmitting using a system dump facility in the operating system to write a last gasp message to the nonvolatile data storage device indicating that failure of the operating system is imminent;

wherein the notifying comprises:

registering a callback function with a kernel portion of the operating system prior to recognizing the abnormal termination of the operating system, the callback function to use the system dump facility to write the last gasp message; and invoking the callback function responsive to recognizing the abnormal termination of the operating system, and wherein the callback function uses a system dump interface created for one or more device drivers of the node to write the last gasp message.

13. The computer program product of claim 12, wherein the pending node failure comprises an impending condition which will cause the node to fail although the node has not failed completely at the time of recognition of the pending node failure.

14. The computer program product of claim 12, wherein the callback function, responsive to being invoked:

traverses one or more registration entries of a kernel extension of the kernel portion of the operating system, wherein a registration entry includes registration information identifying a disk sector of one or more nonvolatile data storage devices used for the nonvolatile data storage device heartbeating and comprising a buffer including a last gasp message; and for each registration entry traversed, using the system dump interface to write the last gasp message stored in the buffer of the registration entry to the identified disk sector, to indicate that failure of the operating system is imminent.

15. A data processing system for liveness determination in a multinode data processing environment, the data processing system comprising:

a memory; and a processing unit in communication with the memory, wherein the data processing system is capable of performing a method, said method comprising:

using by a node of the multinode data processing system nonvolatile data storage device heartbeating in which liveness messages are sent from the node to a nonvolatile data storage device shared with other nodes in said multinode data processing system to indicate liveness of the node, the nonvolatile data storage device being used as a liveness communication medium;

recognizing, by an operating system executing on the node, an abnormal termination of the operating system, the abnormal termination indicating that failure of the operating system is imminent; and responsive to the abnormal termination of the operating system and prior to the operating system failing, notifying, by the operating system, a remote node of the multinode data processing system of a pending node failure, wherein the notifying comprises transmitting a message to the nonvolatile data storage device used for heartbeating, the transmitting using a system dump facility in the operating system to write a last gasp message to the nonvolatile data storage device indicating that failure of the operating system is imminent;

wherein the notifying comprises:

registering a callback function with a kernel portion of the operating system prior to recognizing the abnormal termination of the operating system, the callback function to use the system dump facility to write the last gasp message; and invoking the callback function responsive to recognizing the abnormal termination of the operating system, and wherein the callback function uses a system dump interface created for one or more device drivers of the node to write the last gasp message.

16. The data processing system of claim 15, wherein the pending node failure comprises an impending condition which will cause the node to fail although the node has not failed completely at the time of recognition of the pending node failure.

* * * * *